Oct. 22, 1963 J. E. KOSTUR Re. 25,466

MACHINES FOR AUTOMATICALLY SKIN PACKAGING MERCHANDISE ARTICLES AND FOR CUTTING INTO SEPARATE PACKAGES

Original Filed Dec. 7, 1959 6 Sheets-Sheet 1

INVENTOR
J. Edward Kostur
BY John F. Brezina
ATTORNEY

INVENTOR
J. Edward Kostur
BY John F. Bregna
ATTORNEY

INVENTOR
J. Edward Kostur
BY John F. Bregna
ATTORNEY

INVENTOR
J. Edward Kostur
BY John F. Brezina
ATTORNEY

INVENTOR
J. Edward Kostur
BY John F. Brezina
ATTORNEY

INVENTOR
J. Edward Kostur
BY John F. Brezina
ATTORNEY

United States Patent Office

Re. 25,466
Reissued Oct. 22, 1963

25,466

MACHINES FOR AUTOMATICALLY SKIN PACKAGING MERCHANDISE ARTICLES AND FOR CUTTING INTO SEPARATE PACKAGES

J. Edward Kostur, 16W330 Timber Trails Drive, Elmhurst, Ill.

Original No. 2,976,658, dated Mar. 28, 1961, Ser. No. 857,820, Dec. 7, 1959. Application for reissue July 11, 1962, Ser. No. 210,876
12 Claims. (Cl. 53—112)

Matter enclosed in heavy brackets [ ] appears in the original patent but forms no part of this reissue specification; matter printed in italics indicates the additions made by reissue.

This invention is directed to a novel skin packaging machine adapted to automatically mount and secure plastic film or the like over and upon relatively stiff panels or pieces of cardboard or the like, and to cut and separate relatively large backing panels into individual package in which the articles are sealed and contained.

It is an important object of my invention to provide an automatic skin packaging machine which includes a plurality of platens mounted in driven chains; means for automatically stopping and holding said platens in selected work positions; means for feeding plastic film over the platens and over the articles positioned thereon; automatic means for forming a vacuum in and above said platens to draw the film or wrapping material against the merchandise articles and the backing sheets; movable means for heating the plastic sheets; automatic means for delivering outward the backing sheets with the articles secured thereon; and simultaneously cutting the plastic sheets in one direction; automatic means for cutting the ejected cut strips with articles thereon in the other direction to form individual packed packages, and automatic means for removing the individual cut-apart packages from the area of cutting.

A further object of my invention is the provision of merchandise articles and having the aforesaid structural an automatic skin packaging machine adapted to package features and elements, and having an automatic electrically actuated mechanism for moving a plurality of platens successively into indexed position relative to a vacuum producing means; and having a means for feeding and holding plastic film over the platens, and having a selectively positionable movable oven adapted to be retractably positioned over the indexed platen on which the merchandise articles have been positioned, to thereby heat the film; and having means for producing a partial vacuum in the platens and below the plastic film to drape and draw the film to the base panel to thereby secure the articles to the base panel; and having automatic means for feeding the base panel outward and simultaneously slitting the base panel, with articles secured thereon, into strips; and having an automatic manually controlled mechanism, including a plurality of cross cutters, for cutting said ejected strips in a transverse direction to thereby form a plurality of separate packages; said last mentioned mechanism including means for raising and lowering said cross cutters, and for sweeping away said packages.

It is a further object of my invention to provide a skin packaging machine having means and mechanism for draping and attaching a film sheet over a plurality of spaced apart articles positioned on a board and automatic manually controlled mechanism for feeding outward on to a separate table the article carrying board, and simultaneously slitting it into strips; and automatically operable movable cutting and slitting mechanism to cut said ejected strips in the other and transverse direction to form individual sealed packages.

It is a further object of my invention to provide an automatic machine which will automatically perform vacuum forming operations and products in which a plurality of vacuum formed cavities or blisters will be simultaneously formed in or from a continuous sheet, and which machine has automatically operable means to cut the blank into desired sizes and individual units.

Figure 1:
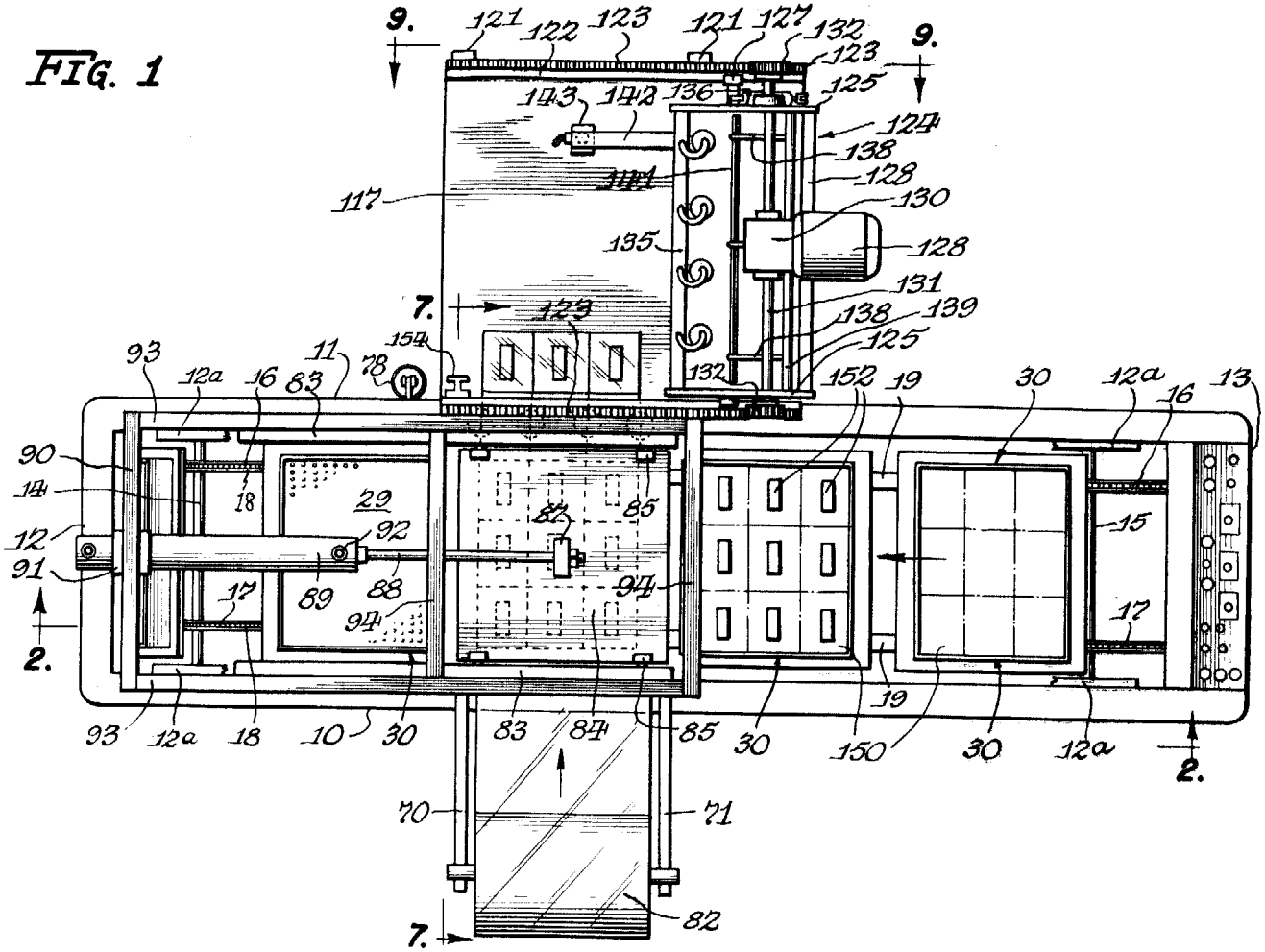
FIG. 1 is a top plan view of my novel skin packaging machine and illustrates an article supporting board or panel in dotted lines.
Figure 3:
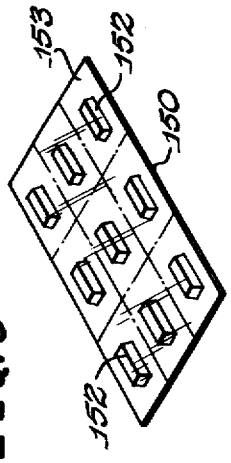
FIG. 3 is a perspective view of a board having a number of articles positioned thereon, the board being cut into nine separate package units.
Figure 4:
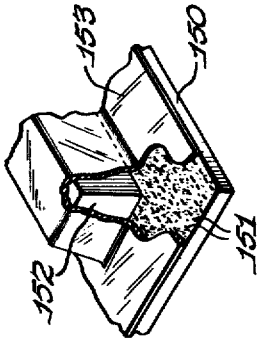
FIG. 4 is an enlarged perspective view of a part of one of the packages showing a part of the supporting board and of the article, and the film partially broken away.
Figure 2:
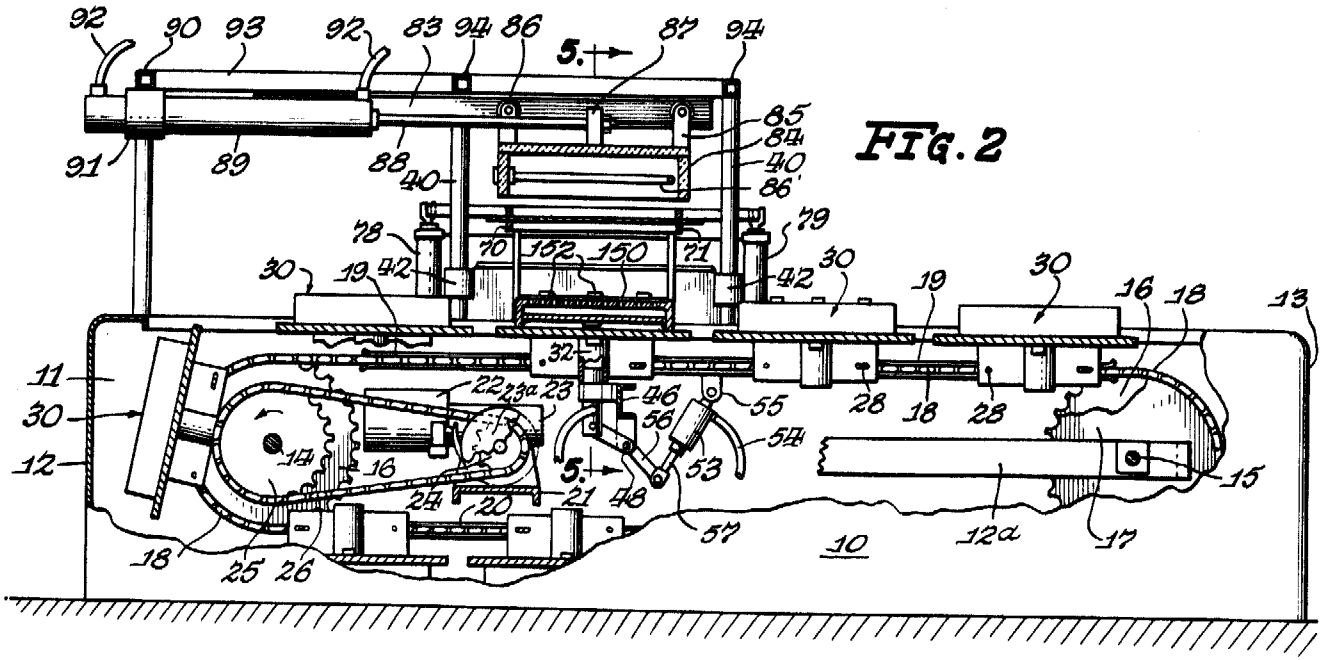
FIG. 2 is a side elevational view partially in sections with a portion of the side wall broken away and showing certain parts in cross section and illustrating the oven in overhead heat applying position, and illustrating one of the platens in registry.

Referring to FIGS. 1 and 2, a rectangular frame is shown having two parallel side walls 10 and 11 and connecting vertical end walls 12 and 13, all of which are connected together at their junctures.

Two horizontal transverse shafts 14 and 15 are journalled at their opposite ends in bearing blocks (not shown) on horizontal longitudinal bars 12a of a metal frame a short distance inward of the ends of the frame (see FIGS. 1 and 2). Mounted on each of said shafts 14 and 15 are two spaced apart sprockets 16 and 17. The two sprockets 16 are in alignment and two sprockets 17 are in alignment.

Figure 5:
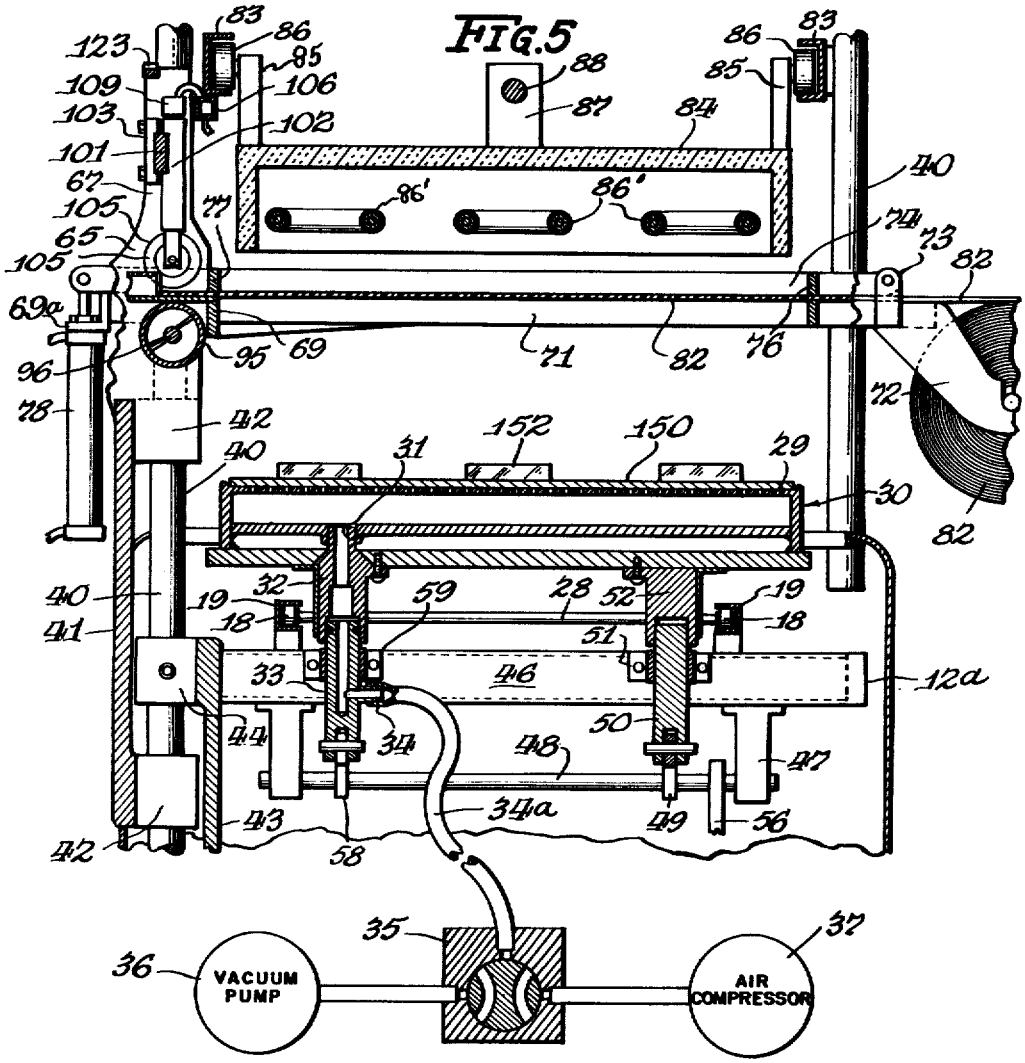
FIG. 5 is a cross sectional view taken on a vertical transverse plane indicated by line 5—5 of FIG. 2, and illustrating the film in clamped and upper position above the articles on a platen, and illustrating the drape carriage in upper position, and illustrating the hollow shaft forming part of the vacuum means in inserted position in one of said platens.
Figure 6:
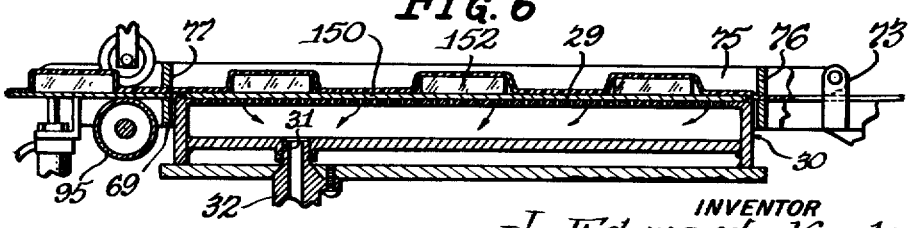
FIG. 6 is a fragmentary cross sectional view similar to FIG. 5 though showing the drape carriage in lowered position and the heated film applied and draped upon the articles, and upon the board.

An endless link chain 18 is mounted on the two sprockets 16 and a similar link chain 18 is mounted on the two sprockets 17. As shown in FIG. 5, the upper metal guide channels 19 are secured on a pair of cross bars 46, one of which is shown in FIG. 5, by means of welding and the upper run of the chains 18 ride through said guide channels 19 to support the chains in a horizontal straight path, as shown in FIG. 2.

A pair of lower guide channels 20 are secured on a transverse side bar (similar to cross bar 46) not shown and forming part of the frame and the lower runs of the chains 18 ride therein to be supported thereby, a part of one of said lower channels 20 being shown in FIG. 2.

Numeral 21 designates a cross bar, shown in cross section in FIG. 2, on which is mounted a brake electric motor 22 and connected speed reducer 23. On the end of the shaft of the speed reducer 23 is secured a sprocket 24 and a cam 23a. A driven sprocket 25 is mounted on shaft 14 and an endless link chain 26 is mounted on aligned sprockets 24 and 25 whereby the power from said motor is transmitted to shaft 14, to sprockets 16 and 17 and to drive the link chains 18. Suitable electrical wires (not shown) connect said motor to an electric supply source through an automatic control switch (not shown).

As shown in FIG. 5, a plurality of spaced apart cross bars or connecting links 28, one of which is shown in FIG. 5, have their opposite ends suitably connected to the endless link chains 18 and the same maintain said chains in proper uniform position.

Numerals 30 designate a plurality of spaced apart hollow platens (preferably ten) which define rectangular chambers and whose upper walls 29 are provided with a plurality of small holes to provide for air passage therethrough. One of said platens 30 is shown in cross section in FIG. 5. The lower wall of each platen has a flanged opening 31 into which a reduced portion of a passaged metal fitting 32 is mounted (see FIG. 5). Each of the passaged fittings is secured by screws to the bottom wall of each platen 29 and the lower portion of each thereof is enlarged to define a round entrance opening or socket into which the end of an air and vacuum nozzle 33 adapted to detractably seat.

Said air and vacuum nozzle 33 is slidably mounted in a bracket 59 which is secured by screws to the upper cross bar 46 of a vertical frame hereinafter described, as illustrated in FIG. 5.

Nozzle 33 has an inlet nipple 34 to which is connected one end of a rubber air hose 34a as shown in FIG. 5.

As shown in FIG. 5, numeral 35 designates a four-way air valve (which is automatically controlled). One inlet of said air valve 35 is connected by a pipe to a vacuum pump 36 and the other inlet of said valve 35 is connected by a pipe to an air compressor 37.

Figure 7:
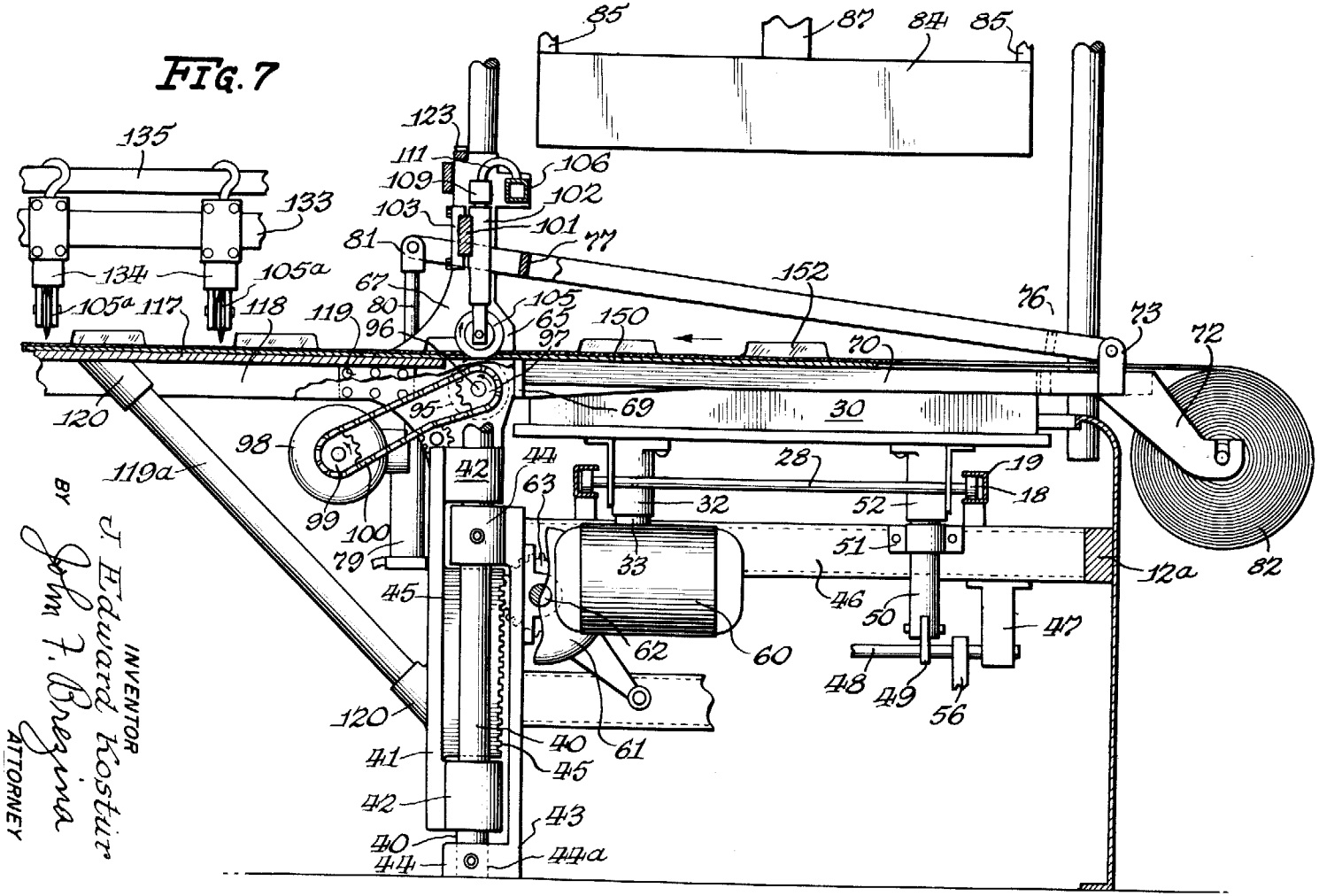
FIG. 7 is a cross section, with parts broken away, taken on line 7—7 of FIG. 1, and illustrating the drape carriage in lowered position and the delivery roll and slitting cutters in lowered position with respect to the slitting table.

As illustrated in FIGS. 5 and 7, a metal mounting bracket 43 having two upper and two lower integral apertured vertically passage knuckles 44 at each side thereof is secured and mounted relative to two posts 40.

Figure 8:
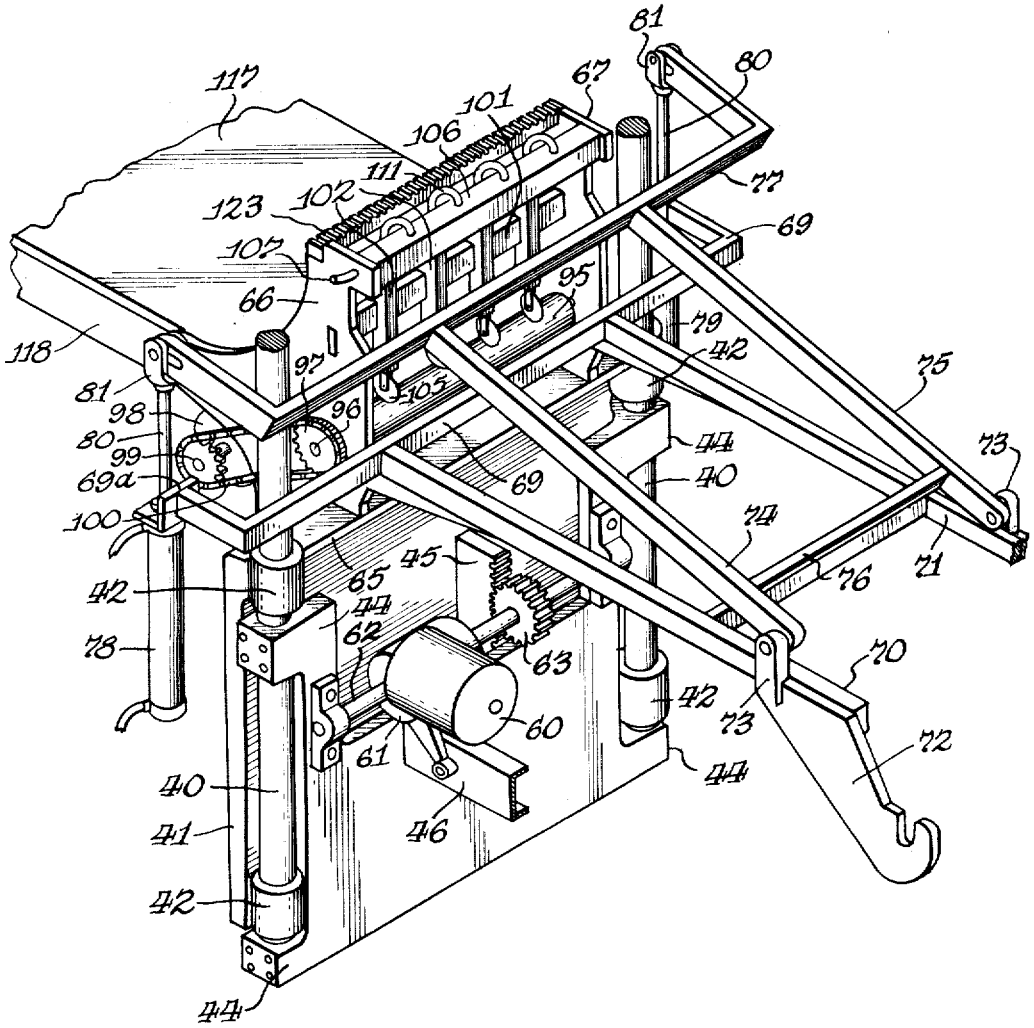
FIG. 8 is a perspective view, with parts broken away, of the movable drape carriage assembly in a position similar to that illustrated in FIG. 7.

A pair of vertical posts or shafts 40 are mounted in the apertured lower extensions 44a and in upper passaged knuckles 44 of the base mounting plate, one of which is shown in FIGS. 5 and 7, and two thereof in FIG. 8.

A substantially rectangular frame bracket or drape carriage 41 having integral passaged knuckles 42 is mounted for vertical slidable movement on the two vertical shafts 40, as shown in FIGS. 5, 7 and 8. As shown in FIGS. 7 and 8, a vertical rack bar 45 is mounted on the slidable bracket or carriage 41. An upper transverse channel-like cross bar 46, shown in FIG. 5 is secured at one of its ends to the two side bars 12a of the frame.

Referring to FIG. 5, cross bar 46 has two depending journalling brackets 47 secured thereon. A transverse shaft 48 has its opposite end portions journalled in said brackets 47. Said shaft 48 has secured thereto one end of metal arm or lever 49, which lever is pivoted by a cross pin to the lower bifurcated end of a slidably mounted metal locating pin 50. Said locating pin 50 is slidably mounted in the vertical passage of a mounting bracket 51 which is secured by screws to cross bar 46, as shown in FIG. 5. Said locating pin 50 is adapted to retractably seat in the downwardly opening cavities of the depending locating members 52, one of which is secured by screws to the lower face of each of the platens 30, one of said screws being shown in FIG. 5.

The means for selectively and intermittently moving the locator pin and air and vacuum nozzle vertically comprises the following. An air cylinder 53 connected to a compressed air source by a pipe 54, shown in FIG. 2, is pivoted to a depending bracket 55. A lever 56 has one end connected to the piston rod 57 of air cylinder 53, said lever having its other end secured on shaft 48. When the piston 57 is projected by air pressure the shaft 48 is rocked a short distance, clockwise looking at FIG. 2, to thereby move the locator pin 50 upwardly into the socket of the member 52 (see FIG. 5). At the same time the slidable air and vacuum nozzle 33 is moved upwardly by the rocking action of shaft 48 moving upwardly the lever 58 which has its outer end pivoted by a cross pin to the lower bifurcated end of nozzle 33, to seat the upper end of the nozzle in the lower socket of the fitting 32. This occurs only when one of the platens has been moved to proper position.

The starting of the machine is accomplished by manual actuation of a starting switch (not shown) which, when closed, energizes the platen moving and indexing gear head motor 22.

A cam 23a is connected to the output shaft of the gear head motor which shaft carries sprocket 24 (FIG. 2).

A micro limit switch (not shown) is tripped and opened by said cam 23a when one of the platens has moved substantially to the correct position, and said limit switch when tripped, opens the circuit to the gear head motor 22 to cause the link chains and platens thereon to stop moving, so that one of the platens is located in substantially correct position to be communicatively connected to the vacuum means recited herein.

The means for selectively and intermittently moving the frame or carriage 41 and attached parts including clamping frame hereinafter described, comprise the following.

As shown in FIG. 7, a brake electric motor 60 is suitably mounted on a bracket connected to the inner frame. The shaft of said motor is connected to drive a built-in speed reducer 61 (a part of which is shown in FIG. 7). The projecting shaft 62 of the speed reducer has secured thereon a gear 63 which meshes with the teeth of rack bar 45. Rotation of said motor in one direction will raise said rack bar 45, the mounting plates 66 and 67, drape bracket or carriage 41, and the parts supported thereby, and opposite rotation thereof will cause a lowering of said bracket or carriage 41, said mounting plates 66 and 67, rack bar 45, and of the auxiliary cutting table hereinafter described.

On the drape carriage or bracket 41 are supported and secured the vertical mounting plates 66 and 67, also the parts hereinafter described as carried and connected to said mounting plates, the lower clamping frame, and the auxiliary cutting table hereinafter described.

As shown in FIG. 8, mounted and secured to the upper end of frame or carriage 41 is a metal centrally passaged vertical extending flanged mounting plate 65. Two vertical apertured mounting plates 66 and 67 have their lower ends secured to mounting plate 65, for example by welding. A stationary horizontal cross bar 69 having angularly bent ends is secured for example by welding on the edges of vertical plates 66 and 67. Said vertical plates 66 and 67 are secured to the upper end of drape bracket or carriage 41, as shown in FIG. 7.

As shown in FIG. 8, a pair of spaced apart parallel arms 70 and 71 have one end of each thereof welded to the cross bar 69. These form a lower clamping frame which is raised or lowered along with the movable bracket or carriage 41.

A pair of recessed metal suspension hooks 72 are secured by welding on the outer end of each of said arms 70 and 71, and on which a roll of thin plastic sheet is adapted to be hung and journalled by means of a suitable rod (not shown). In FIG. 8 only one of said hooks 72 are shown.

As shown in FIG. 8, pivoted by pins or rivets to the upwardly extending apertured ears 73 of arms 70 and 71 is an upper pivotal clamping frame which comprises two metal arms 74 and 75. Said arms 74 and 75 are connected by a secured rear cross link 76 and by a longer U-shaped clamping cross bar 77 whose opposite ends are bent angularly as shown in FIG. 8.

Mounted on the opposite ends of lower cross bar 69 are apertured angular brackets 69a to which are secured the upper ends of two air cylinders 78 and 79 respectively, as shown in FIG. 8. Said cylinders have reciprocating pistons 80 as shown, and are also connected by flexible pipes to a control valve and to a compressed air source (not shown). The upper ends of pistons 80 are connected by clevises 81 and pins to the slotted opposite ends respectively of the upper clamping frame bar 77.

It will be understood that air introduction to project said pistons 80 will raise and open the said upper clamping frame, and that retraction of said pistons will lower and close said upper clamping frame so that the plastic sheet areas or sections between said sections of said clamping frame will be temporarily clamped and held in flat position. In FIG. 8, said clamping frame is shown in upper open position.

In FIG. 5 said clamping frame is shown in upper raised position and the upper clamping frame is shown in closed clamping position holding a section of plastic film 82 therebetween in which upper position it is temporarily heated as hereinafter described.

Said means for selectively and automatically raising and lowering the entire clamping frame and the attached parts, including the slidable carriage or bracket 41 and plates 66 and 67 are also illustrated in FIG. 8 as well as partially in FIG. 7, and include the motor 60, shaft 62, gear 63 and rack bar 45. It is advantageous and important to maintain the entire clamping frame in elevated position during the feeding or delivery of the plastic sheet into said frame and during the heating thereof.

DESCRIPTION OF ROLLABLY MOUNTED HEATING MEANS

Referring to FIG. 5, secured by welding on the upper end portions of posts 40, are two channel-like metal horizontal guide tracks 83 opening inwardly.

Numeral 84 designates an inverted hood or oven which is preferably insulated, and which has secured thereto a plurality of suspension links 85 which extend upwardly. Journalled by pins on the upper ends of said links 85 are rollers 86 which ride in the channel tracks 83. Said hood 84 forms an inverted oven and has mounted therein a plurality of electrical heating elements 86', three of which are illustrated in FIG. 5.

Said rollably mounted oven is adapted to be selectively and automatically moved into position over the clamping frame and over the plastic sheet, and selectively retracted therefrom.

Referring to FIG. 2, numeral 87 is an apertured lug to which is connected the free end of a piston rod 88 of air cylinder 89. Air cylinder is connected to a cross bar 90 by means of a clamping bracket 91. Said air cylinder is connected by two flexible air hoses 92 to an automatically operable air control valve (not shown) and to a compressed air source (not shown).

In FIG. 2 numeral 93 desigates a longitudinal bar connecting transverse connecting bars 94 which in turn connect the upper ends of the vertical posts.

MECHANISM FOR AUTOMATICALLY FEEDING AND MOVING PLASTIC FILM

As shown in FIGS. 5 and 7 an elongated feeding and slitting roller 95 is mounted on a horizontal shaft 96 which is journalled at its opposite ends in apertures in the lower portion of mounting plates 66 and 67 as shown in FIG. 8. Said roller 95 is vertically movable along with said mounting plates 66 and 67.

Referring to FIGS. 7 and 8, mounted on one end of shaft 96 is a sprocket 97. A brake electric motor 98 has mounted on its shaft a sprocket 99. An endless link chain 100 is mounted on sprockets 99 and 97 whereby the roller 95 will be selectively and automatically rotated to the desired degree. Said roller 95 is adapted to cooperate with a plurality of vertically movable cutting elements hereinafter described.

AUTOMATIC MECHANISM FOR CUTTING AND SLITTING STRIPS IN ONE DIRECTION

As illustrated in FIGS. 5, 7, 8 and 11 a plurality, preferably four, of retractable air-operable cutting devices are mounted above the roller 95. A horizontal mounting bar 101 has its opposite ends secured in holes in the vertical mounting plates 66 and 67.

Figure 11:
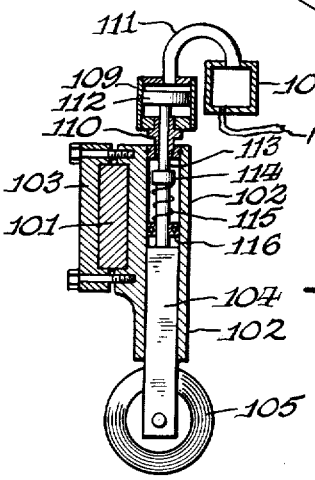
FIG. 11 is a vertical cross sectional view on a vertical plane through one of the slitting and cutting devices.

A plurality of vertical cylindrical casings 102, 4 of which are shown in FIG. 8, and which have cylindrical chambers, are secured to bar 101 by clamps 103 and bolts (see FIG. 11). In each of the cylindrical chambers of casings 102 a metal plunger 104 is slidably mounted. On the lower bifurcated end of each plunger 104 a disk-like circular cutter 105 is journalled by means of a cross pin, as shown in FIGS. 5, 7 and 11.

Mounted in the upper ends of the mounting plates 67 is a header pipe or manifold 106, which has one end thereof communicatively connected by a hose 107 to an automatically controlled air valve (not shown) and to a compressed air source.

As shown in FIG. 11, a plurality of air cylinders 109 are connected by threaded fittings 110 to the upper apertures of the vertical casings 102, respectively. Said cylinders 109 are also communicatively connected at their ends by nipples or flexible pipes 111 to the manifold 106. A piston 112 is slidably mounted in each of the cylinders 109 and each thereof is connected by a connecting rod 113 to the lower vertically movable plungers 104, respectively. Each of said connecting rods 113 has a metal collar 114 secured on its intermediate portion, and an expansion metal spring 115 is mounted between each of said collars 114 and inwardly extending annular rings 116 which are secured on the inner face of the casings 102, respectively, as shown in FIG. 11.

It will be understood that when compressed air is introduced into and through the manifold 106 in the manner hereinafter described, with the aid of an automatically operable valve, the respective pistons 112 will be pushed downwardly to in turn push downwardly the cutters 104, said cutters being pressed into engagement with the roller 95.

Each board strip or panel 150 with the merchandise articles thereon is moved outwardly and transversely of the machine by action of said roller 95 and simultaneously slit by the cutters 105 in one direction into strips, as hereinafter described.

DESCRIPTION OF CUTTING TABLE AND OF AUXILIARY CUTTING AND SWEEPING MECHANISM

Figure 9:
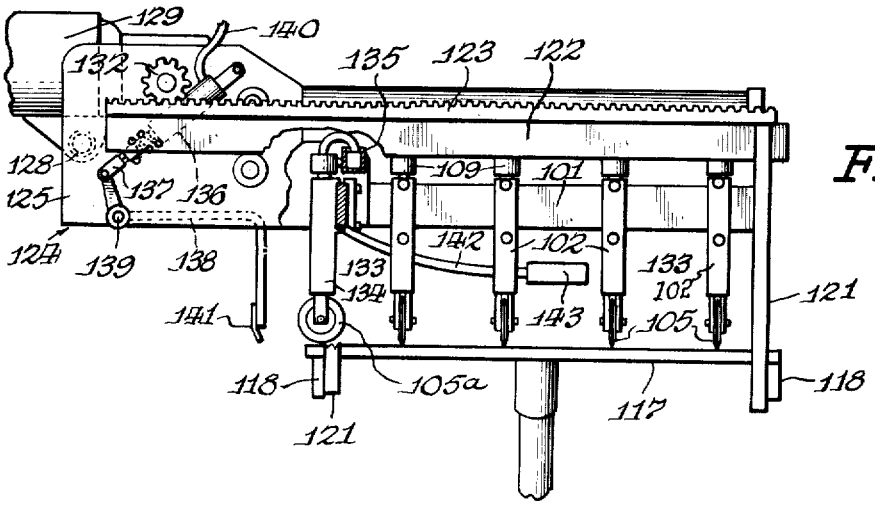
FIG. 9 is an end view of the slitting and cutting table, as seen from line 9—9 of FIG. 1, and illustrating the slitting cutters in lowered position.
Figure 10:
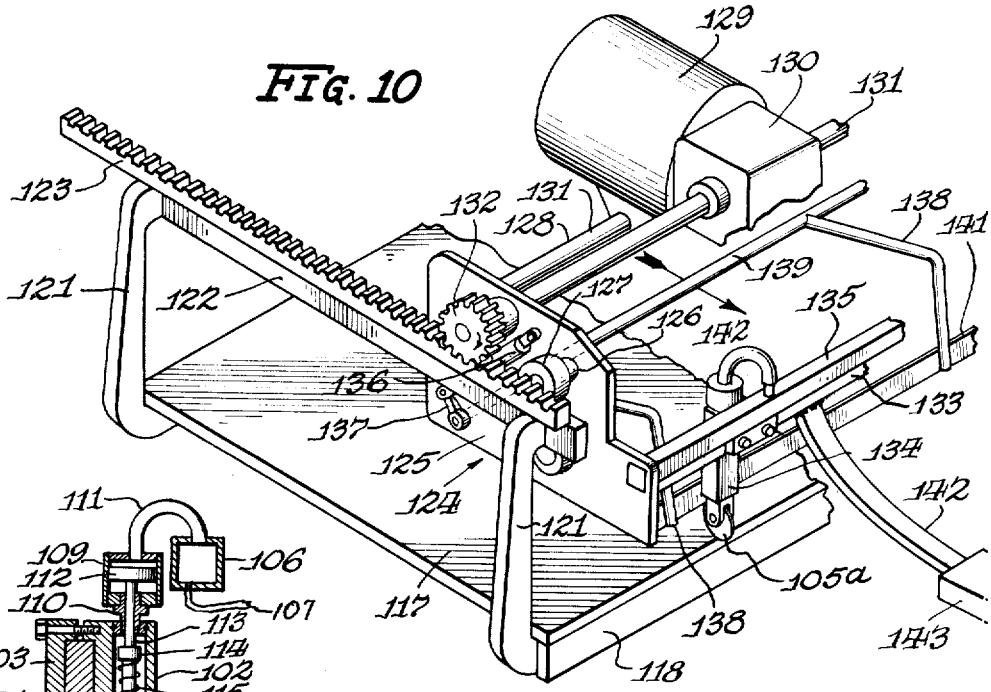
FIG. 10 is a fragmentary perspective view of a portion of the slitter table and of the carriage assembly shown in a position opposite to the position shown in FIG. 9, and wherein the slitters are at the end of their cutting stroke and the sweeper bar is in raised position.

The auxiliary delivery and cutting table and mechanism is illustrated at the left of FIGS. 1, 7 and 8 and in FIGS. 9 and 10.

Referring to FIGS. 1, 7, 8, 9 and 10, reference numeral 117 designates a horizontal table which is secured on horizontal reinforcing bars 118, which said bars are connected at one end to each thereof by a bracket 119 (see FIG. 7) to the vertical mounting plates 66 and 67 and to the vertically movable mounting carriage 41, so that said table is vertically movable as herein described.

As shown in FIGS. 7 and 9, said table is also supported by a diagonal brace 119a, whose opposite ends are secured in suitable brackets 120, said brackets being secured on mounting plate 65 and on the bottom of said table 117, respectively.

The outer end portion of said table 117 has secured to its outer corners two metal angular brackets 121, which said brackets have secured on the upper ends thereof a pair of horizontal metal rails 122 and a pair of parallel toothed rack bars 123, as illustrated in FIGS. 9 and 10, one thereof being shown in FIG. 10.

As shown in FIGS. 9 and 10, a metal carriage 124 has two vertically extending end plates 125 thereon. A pair of cam followers with rollers 127 are bolted on said plates 125 respectively, and adapted to ride on the horizontal rails 122.

A connecting bar 128 connects one end of each of said carriage side plates 125, a fragment of which is shown in FIG. 10. A header pipe 135 also connects said carriage side plates 125 and is connected by a hose (not shown) to a control valve (not shown) and to a compressed air source (not shown).

Mounted on the shaft 128, as shown in FIGS. 9 and 10, is a gear-head electric motor 129 having built in electric brakes and having an operably connected speed reducer 130 thereon. Said speed reducer 130 has a driven horizontal shaft 131 operably connected thereto, one end of said shaft 131 being journalled in the two outer carriage plates 125 and having secured on each of its outer ends a gear 132. Said gears are in meshing engagement with the teeth of rack bars 123 respectively, as shown in FIG. 10.

Each of the upper cylinders of the housings 134, which slidably mount cutters 105a has its upper cylinder communicatively connected by a flexible air hose and disconnectable coupling to a header pipe 135, shown at the right of FIG. 10. When air under pressure is introduced into header 135 the cutters 105a will be moved to lowered position, against the action of internal springs 115, in which lowered position the cutting edges will contact the auxiliary table. When air pressure is removed from header pipe 135, the springs 115 of the cutter moving devices, as shown in FIG. 11, raise said cutters 105a a short distance wherein they will not contact any board upon said table.

As shown in the lower left portion of FIG. 10, and the middle portion of FIG. 9, a horizontal mounting bar 133 has its opposite ends secured in the vertical carriage side plates 125. Mounted on said mounting plate 133 in horizontally spaced apart relation are clamped a plurality of vertical housings or casings 134, which are of the construction shown in detail in FIG. 11 and previously described. Each of said housings 134 form part of the said vertically movable cutting devices illustrated in FIG. 11 and include the air-actuated pistons 112 and plungers 104 and lower journalled disk-like cutters 105a.

Referring to FIGS. 9 and 10, the carriage 124 and the cutting or slitting devices 134 carried thereby are normally in the non-operative retracted position illustrated in FIG. 10, in which position the auxiliary delivery table is clear and on to which the board strips carrying articles secured thereon are delivered by action of the driven roller 95 from their former position on a platen.

When the article-carrying board strips, which have been slit in one direction, each of which has several articles secured thereon, are delivered sufficiently far on the auxiliary table 117 the brake motor 129 is energized for a short interval by the operation of a control switch which is actuated by an electric eye 143 adjustably mounted on a bracket arm 142 adjacent the outer edge of the table as illustrated in FIG. 10. Said electric eye 143 is actuated by the interruption of its ray by the forward edge of the strip delivered upon the table.

Said closing of said switch will energize the motor 129 and rotate shaft 131 and gear 132 in one direction, and at the same time, closing of said control switch opens an air control valve (not shown) to introduce compressed air into the manifold or header pipe 135 to cause the cutters 105a to be lowered. As the shaft 131 and gears 132 are thereby rotated the carriage 124 and parts mounted thereon are moved transversely across the table 117 causing the cutters 105a to cut the article-carrying strips in a transverse direction, to thereby form individual rectangular board or backing strips and packages, each of which have one or a group of merchandise articles secured thereon by the plastic film.

When the carriage travels across auxiliary cutting table and cuts the strips transversely, the compressed air is in manifold 135 and at the same time said compressed air is in the cylinder 136 shown in FIG. 9 to thereby hold the scraper in upper elevated position and the cutters are held in downward and cutting position.

Referring to FIGS. 9 and 10, numeral 136 is an air cylinder having a piston and piston rod 137 and which is secured at its upper end by a bolt to one of the carriage side plates 125 (see FIG. 9).

A pair of S-shaped angular metal levers 138 each has an intermediate bearing 139 which is journalled to a pin secured on and projecting from carriage side plate 125. The upper ends of said levers 138 are pivoted by a pin to the projecting end of piston rod 137.

The lower downwardly extending edge of the levers 138 have an elongated horizontal scraper or sweeper bar or strip 141 secured thereon as illustrated in FIGS. 9 and 10. Said sweeper bar 141 is adapted, when lowered, to slide upon the upper face of the table 117 when the carriage is returned to original starting position, to thereby remove and sweep the cut individual packages from the face of table 117.

The upper end portion of air cylinder 136 is connected by a hose 140 (a fragment of which is shown in FIG. 9) to a solenoid operated air control valve and a compressed air source (not shown). When compressed air is maintained in the cylinder 136, the levers 138 and sweeper bar 141 are held in slightly upraised position above the table 117, and such out-of-contact positions thereof are maintained when the carriage 124 and the lowered cutters 105a are moved in one direction across the table 117.

When compressed air is in the manifold 135 the air is also in cylinder 136 and holds the scraper in up position and cutters in down position. When pressure of said air in cylinder 136 is removed the springs 115 raised the cutters 105a and the spring on the piston rod 137 will move the scraper 141 down to table contact position.

A reversible trip switch 154 illustrated diagrammatically in FIG. 1 is mounted on the side wall of the machine, said limit switch having an external lever. When the carriage rollably mounted above the auxiliary cutting table 117 and the cutters 105a have travelled through its cutting stroke across the table to substantially its opposite edge, said carriage engages said trip lever 154 to thereby move said switch into a reverse direction to in turn cause said carriage motor 129 to run in reverse direction, and at the same time causes retraction or raising of the cutters 105a through release of air from the manifold 135 and cylinders 109 and also causes the sweeper arms and sweeper bar 141 to be lowered due to the release of air from cylinder 136.

When the pressure of said air is removed from the cylinder 136, the springs 115 in cylinders 134 raise the cutters 105a, this occurring at the end of the cutting stroke. When compressed air is released from cylinder 136, gravity will cause the levers 138 to be rocked and thereby lower the scraper 141 to cause said scraper to contact the upper face of the auxiliary table 117. As the said carriage retracts and goes back to its starting position, the said scraper 141 will scrape or sweep the individual skin packages from the table 117 to drop same in a suitable receptacle. The operation is as follows:

A roll of suitable plastic flexible film 82 is first placed and rotatably mounted with respect to hanger brackets on one end of the clamping frame. The film sheet is then threaded through the open clamping frame and with the end portion thereof positioned over the feed and slitting roll 95. This is done while the carriage 41 and clamping frame are in upper elevated position as illustrated in FIG. 5. A manually operated electric switch (not shown) is operated to introduce compressed air into the manifold 106 to move the cutters 105 into contact with the edge portion of the sheet film, and at the same time a valve is opened to introduce compressed air into the upper portions of the air cylinder 78 to close the upper clamping member 74 to thereby impinge the said film in the manner illustrated in FIG. 5.

A panel of cardboard 150 which has a plurality of small holes or perforations thereon is placed on one of the platens which is in an exposed position before it moves under the clamping frame, and a plurality of merchandise articles are placed on said board in spaced apart positions.

An automatic operable electric switch is manually operated to energize the electric motor driving the sprockets 16 and 17, and chains 18 to properly position one of the platens (which carries air-pervious card or board 150 with spaced apart articles thereon) in a position below said elevated clamping frame. A "startbutton" of an electrical switch has been pushed by the operator to accomplish the correct positioning of the loaded platen, as illustrated in FIG. 2. As said positioning is automatically accomplished, compressed air is introduced into cylinder 53 from a compressed air source to cause lever-actuated upward movement of the locater pin 50, which seats in the downwardly opening socket of the locating member 52, and at the time the lever 58 is moved up to slide upwardly the vacuum passage nozzle 33 to seal and seat its upper end portion into the depending socket of metal fitting 32 (see FIG. 5). By said seating connection of nozzle 32, the air inlet positioned platen is communicatively connected with a vacuum pump 36, the valve 35 being simultaneously actuated to communicate said vacuum pump with the chamber of said platen.

The operator will then operate an electric switch (not shown) which operates a solenoid operated air valve to thereby admit air into cylinder 89 (see FIG. 2) to thereby project piston 88 and move the movable oven into position directly over the said film held in the clamping frame 70, 74. Said last mentioned switch has a suitable electric timer thereon which will cause it to open and to operate a suitable valve which will admit compressed air to hose 92 in the forward portion of cylinder 89, to thereby retract said oven to its original position.

Thereupon the operator will operate a suitable switch (not shown) which energizes motor 60 and transmits its power to move downwardly the vertically slidable carriage 45 as well as the clamping frame and other parts supported thereby. The heating of the said film has caused the said film to become sticky and tacky, and as the downward movement of carriage 41 and clamping frame moves the heated film into contact with the exposed areas of the pervious or perforated board 150 and articles position thereon, the air valve 35 is automatically operated to communicate the vacuum pump 36 to the nozzle 33 to thereby produce a partial vacuum in the positioned platen. The air pressure from above will press downwardly due to the partial vacuum in the platen and drape the plastic sheet upon and about the merchandise articles and adhere the sheet film to the said board 150.

At the same time that the mechanical application of the heated plastic sheet occurs, the actuation of last mentioned switch, compressed air is also introduced into lower portions of cylinder 78 to thereby move the clamping member of clamping frame 74 into upper position, as illustrated in FIGS. 7 and 8.

Upon opening of said clamping member 74, an electric switch (not shown) is manually actuated to energize motor 98 to drive and rotate the expelling delivery roll 95 to cause it to pull the card or board and film, and enclosed articles, transversely and outwardly to cause the respective spaced apart lowered cutters 105 to slit and cut said card or board 150 into longitudinal strips. Each of said strips will have one, or a plurality, of spaced apart articles secured thereon.

This outward movement of adjacent and cut strips of said board continues until the forward edge portion of one of said strips interrupts a ray of an electric eye stopping device, which device thereupon causes the control switch of motor 98 to be opened to thereby stop rotation of the roller 95 and starts cross cutter in operation. At this point the strips of pervious board carrying articles sealed thereon have been delivered from the auxiliary table 117, and the device for cross-cutting of said strips is set into operation.

As the roller 95 rotates, while delivering the slit strips outwardly, said roller has drawn or pulled another section of the said sheet film 82 over the lower part of the open clamping frame. The upper portion of the clamping frame is thereupon moved and closed downwardly by introduction of compressed air into the upper portions of cylinder 78. This air introduction is actuated by the control switch operatively connected thereto.

As the longitudinal strips, each of which has a plurality of spaced apart packaged articles secured thereto, are fed outwardly by roller 95, the same are delivered and positioned upon the auxiliary table 117. At this time the movable carriage and respective cutters 134, 105a are in an out of the way position just above one edge of the auxiliary table 117. Thereupon the operator will actuate a switch (not shown) to operate an air controlled valve to admit compressed air into header 135 (see FIG. 9) to lower the respective plungers with their cutters 105a and at the same time the operation of said switch will energize motor 129 to cause rotation of shaft 131 and gears 132 to thereby move said carriage and said cutters 105a in a horizontal cutting stroke across said auxiliary table 117 to thereby transversely cut said board strips into rectangular or square pieces, each of which pieces will have one or more merchandise article sealed, secured, and skin-packaged thereon.

When the carriage illustrated in FIGS. 9 and 10 has reached the end of its cutting stroke, a switch (not shown) is automatically actuated to in turn operate a valve to permit exit of compressed air from the cylinder 136, and at the same time a spring mounted about the piston rod in said cylinder 176 will move said piston rod longitudinally to in turn rock clock-wise the levers 183 to thereby lower the scraper 141 into sliding contact with the upper face of auxiliary table 117.

As the motor 129 is a reversible motor controlled by a reversible switch, the operator will actuate said reversible switch to cause opposite rotation of motor 129 to thereby cause a retracting and return movement of said carriage, during which return movement the scraper 141 will push off of said auxiliary table 117 all of the individual skin-packaged articles.

I desire that it be understood that the construction, arrangement and cooperation of the respective parts of said machine hereinbefore described provides for continuous and automatic operation thereof; and that the operation is begun by the operator pushing a starting button to close the switch to the main starting and driving motor which intermittently drives the sprockets and link chains. Such starting by closing of the starting switch starts a continuous cycle of operation as has been described, and the machine will run continuously through each and every operation as described until a stop switch is manually actuated to open the circuit to stop the driving mechanism. During such operation it is only necessary that the operator load the respective platens by placing thereon the flat perforated card-boards and placing on said card-boards in the desired locations the respective merchandise articles to be packaged.

As before described, the operator will place the perforated card-board sheets and the articles thereon upon the platen which is in advance of the position of the clamping frame and before the described conveyor moves the same into a position below the clamping frame which later drapes and secures the merchandise articles in spaced apart position on the perforated card-board sheet.

While the foregoing specification sets forth the invention in specific terms, it is to be understood that numerous changes in the shape, size and materials may be resorted to without departing from the spirit and scope of the invention as claimed hereinafter and it is contemplated that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In an automatic machine for skin packaging merchandise articles; elongated frame; a pair of transverse shafts journaled on said frame; a pair of spaced apart sprockets mounted on each of said shafts; a pair of endless link chains mounted on said sprockets respectively; a plurality of hollow foraminated platens having their lower portions pivotally connected to said chains respectively; each of said platens having an air chamber opening through holes in the upper panel of said platens; each of said platens having a passaged socket-like fitting connected thereto; a pair of longitudinal fixed guide rails; shafts and rollers connected to said platens, said rollers normally riding in said guide rails; a brake motor for driving said chains to selectively move said platens; automatically controlled switch means for energizing said motor; mechanism for selectively stopping said chains to selectively position said platens; a slidably mounted passaged plunger communicatively connected to an air valve and a vacuum pump and an air compressor; a motor driven mechanism for selectively moving said plunger into sealing engagement with said socket whereby a partial vacuum will be created in said platens; a clamping frame for supporting plastic sheet film; an upper frame pivotally mounted on said frame member; air operated slidable mechanism for selectively lowering and raising said clamping frames to impinge and hold plastic sheets; a plurality of upwardly extending posts; a pair of horizontal rails on said posts; a movable oven rollably mounted on said last mentioned rails whereby said oven may be selectively positioned over said frame and said plastic sheet; the downward movement of said clamping frame being adapted to position said plastic sheet over articles supported on a board on one of said platens; the partial vacuum in said platens being adapted to draw and drape said plastic sheet over said articles and secure said sheet to a backing board; motor driven mechanism for outwardly moving an article-carrying board from said platens; a plurality of air-actuated cutters mounted above said last mentioned motor driven mechanism; said cutters being movable to cutting position to slit said article-carrying board in one direction as said board is moved from a platen; an auxiliary cutting table connected to the frame to one side of said machine frame; a pair of bracket-supported rails mounted above said auxiliary table; a horizontal rackbar secured on said brackets; a rollable carriage movable on said rails of said auxiliary table; motor operated gear mechanism coacting with said rack bar for moving said carriage horizontally above said auxiliary table; a manifold pipe on said carriage; a plurality of spaced apart movable cutters mounted on said carriage; air-operated mechanism connected to said manifold and adapted to selectively lower said cutters into engagement with said table, said mechanism including springs for elevating said cutters; said cutters on said carriage, when lowered, being adapted to cut transversely the strips of board on said auxiliary table to thereby form individual packages.

2. In a machine for automatically skin-packaging merchandise articles; an elongated frame; a pair of transverse shafts mounted adjacent the ends of said frame; sprockets spaced apart and mounted on said shafts; a pair of endless link chains mounted on said sprockets respectively; a plurality of hollow platens pivotally connected to said chains each of said platens having a perforated flat upper wall and having an interior chamber; an electric motor for driving said chains; mechanism for automatically stopping said chains and positioning each of said platens; a vertically slidable carriage mounted on said frame; motor driven mechanism for selectively raising and lowering said carriage; a plurality of upwardly extending mounting plates connected to said carriage; a horizontal clamping frame mounted on said mounting plates, said clamping frame having a pivoted clamp member and having means for holding film therein; a plurality of vertically movable air pressure actuated cutters mounted between said mounting plates; mechanism for automatically and intermittently actuating said cutters upwardly and downwardly; air-operated mechanism for automatically and intermittently operating said clamp member; a driven roller journalled with respect to said mounting plates; motor driven mechanism for automatically and selectively driving said roller, said cutters being adapted to be lowered into contact with said roller; a plurality of vertical posts; a pair of horizontal guide rails mounted on said posts; a downwardly opening electrical oven rollably mounted on said rails; air-actuated mechanism for selectively moving said oven into and out of position over said clamping frame; said oven being adapted to heat film in said clamping frame; said platens being adapted to have air-pervious boards and articles positioned thereon; automatically retractable means for intermittently communicating the interior of each of said platens with a vacuum pump, said last mentioned means being adapted to produce a partial vacuum in the chambers of said platens to cause said film to be draped over said articles and adhered to said board; the driven rotation of said roller being adapted to move said board-carried draped articles outwardly, and said cutters being adapted to simultaneously slit said board during its outward movement.

3. In a machine for automatically skin-packaging merchandise articles; an elongated frame; a pair of transverse shafts mounted adjacent the ends of said frame; sprockets spaced apart and mounted on said shafts; a pair of endless link chains mounted on said sprockets respectively; a plurality of hollow platens pivotally connected to said chains, each of said platens having a perforated flat upper wall and having an interior chamber; an electric motor for driving said chains; a switch controlled mechanism for automatically stopping said chains and positioning each of said platens;

a vertically slidable carriage mounted on said frame; motor driven mechanism for selectively raising and lowering said carriage; a plurality of upwardly extending mounting plates connected to said carriage; a horizontal clamping frame mounted on said mounting plates, said clamping frame having a pivoted clamp member and having means for holding sheets of film therein; a plurality of vertically movable air pressure actuated cutters mounted between said mounting plates; mechanism for automatically and intermittently actuating said cutters upwardly and downwardly; air-operated mechanism for automatically and intermittently operating said clamp frame; a driven roller journalled with respect to said mounting plates; motor driven mechanism for automatically and selectively driving said roller, said cutters being adapted to be lowered into contact with said roller; a plurality of vertical posts; a pair of horizontal guide rails mounted on said posts; a downwardly opening oven rollably mounted on said rail; air-actuated mechanism for selectively moving said oven into and out of position of said clamping frame; said oven being adapted to heat the film in said clamping frame; and retractable means for intermittently communicating the interior of each of said platens with a vacuum pump, said last mentioned means being adapted to provide for producing a partial vacuum in the chambers of said platens to cause said sheet film to be draped over said articles and adhered to said board; the driven rotation of said roller being adapted to move said board-carried draped articles outwardly, and said cutters being adapted to simultaneously slit said board during its outward movement.

4. In a machine for automatically skin-packaging merchandise articles; an elongated frame; a pair of transverse shafts mounted adjacent the ends of said frame; spaced apart sprockets mounted on said shafts; a pair of endless link chains mounted on said sprockets respectively; a plurality of hollow platens pivotally connected to said chains; each of said platens having a perforated flat upper wall and having an interior chamber; and electric motor for driving said chains; mechanism for automatically stopping said chains and positioning each of said platens; a vertically slidable carriage mounted on said frame; means for slidably mounting said carriage relative to said frame; motor driven mechanism for selectively raising and lowering said carriage; a plurality of upwardly extending mounting plates connected to said carriage; a horizontal clamping frame mounted on said mounting plates, said clamping frame having a pivoted clamp member and having means for holding sheet film therein; a plurality of vertically movable air pressure-actuated cutters mounted adjustably between said mounting plates; automatic air-actuated means for intermittently moving said cutters upwardly and downwardly; air-operated mechanism for automatically and intermittently operating said clamp member; a driven roller journalled with respect to said mounting plates; motor driven mechanism for automatically and selectively driving said roller, said cutters being adapted to be lowered into contact with said roller; a pair of horizontal guide rails mounted above said frame; a downwardly opening electrical oven rollably mounted on said rails; air-actuated mechanism for selectively moving said oven into and out of position over said clamping frame; said platens being adapted to have air-pervious boards and articles positioned thereon; automatically retractable means for intermittently communicating the interior of each of said platens with a vacuum pump, said last mentioned means being adapted to produce a partial vacuum in the chambers of said platens to cause said sheet film to be draped over said articles and adhered to said board; the driven rotation of said roller being adapted to move said board-carried draped articles outwardly, and said cutters being adapted to simultaneously slit said board during its outward movement.

5. In a machine for automatically skin-packaging merchandise articles; an elongated frame; a pair of transverse shafts mounted adjacent the ends of said frame; sprockets spaced apart mounted on said shaft; a pair of endless link chains mounted on said sprockets respectively;

a plurality of hollow platens pivotally connected to said chains; each of said platens having a perforated flat upper wall and having an interior chamber;

said platens being adapted to have air-pervious boards and articles positioned thereon;

an electric motor for driving said chains; mechanism for automatically stopping said chains and positioning each of said platens; a vertically slidable carriage mounted on said frame; means for slidably mounting said carriage relative to said frame; motor driven mechanism for selectively raising and lowering said carriage; a plurality of upwardly extending mounting plates connected to said carriage; a horizontal clamping frame mounted on said mounting plates, said clamping frame having a pivoted clamp member and having means for holding sheet film therein; a plurality of vertically movable air pressure-actuated cutting devices adjustably mounted between said mounting plates; automatic air-actuated means for intermittently moving said cutters downwardly; springs on said cutting devices for moving same upwardly, air-operated mechanism for automatically and intermittently operating said clamp member; a driven roller journalled with respect to said mounting plates and below said cutting devices; motor driven mechanism for automatically and selectively driving said roller, said cutting devices being adapted to be lowered into contact with said roller; a pair of horizontal guide rails mounted above said frame; a downwardly opening electrical oven rollably mounted on said rails; air-actuated mechanism for selectively moving said oven into and out of position over said clamping frame;

and automatically retractable means for intermittently communicating the interior of each of said platens with a vacuum pump, said last mentioned means being adapted to provide for producing a partial vacuum in the chambers of said platens to cause said sheet film to be draped over said articles and adhered to said board; the driven rotation of said roller being adapted to move said board-carried draped articles outwardly, and said cutter being adapted to simultaneously slit said board during its outward movement.

6. In a machine for automatically skin-packaging merchandise articles; an elongated frame; a pair of transverse shafts mounted adjacent the ends of said frame; spaced apart sprockets mounted on said shafts, a pair of endless link chains mounted on said sprockets respectively; a plurality of hollow perforated passaged platens pivotally connected to said chains; guide rails on said frame for guiding said platens; a brake motor for driving said chains; a control switch for said motor; mechanism for selectively stopping said chains to selectively position said platens; automatic means for intermittently communicating said platens to a vacuum source; a vertically slidable carriage; mounting plates on said carriage; a clamping frame mounted on said plates; said clamping frame having a pivotal member; air operated mechanism for opening and closing said clamping frame; said clamping frame being adapted to hold plastic film therein; automatic mechanism for raising and lowering said carriage and said clamping frame; a movable electric oven; air-operated mechanism for moving said oven horizontally relative to said clamping frame; said plastic sheet held in said clamping frame being selectively positionable upon a pervious board on said platens and said board being adapted to have articles thereon; mechanism for selectively producing a vacuum in each platen to cause draping and securance of a heated plastic sheet on a board over the articles thereon; and automatic mechanism for moving outwardly a board having articles secured thereon by said plastic film and for simultaneously cutting apart said board with articles thereon.

7. In an automatic machine for skin packaging merchandise articles; an elongated frame; a pair of transverse shafts journaled on said frame; a pair of spaced apart sprockets mounted on each of said shafts; a pair of endless link chains mounted on said sprockets respectively; a plurality of hollow foraminated platens having their lower portions pivotally connected to said chains respectively; each of said platens having an air chamber opening through holes in the upper panel of said platen; each of said platens having a passaged socket-like fitting connected thereto; a pair of longitudinal fixed guide rails; shafts and rollers connected to said platens, said rollers normally riding in said guide rails; a brake motor for driving said chains to selectively move said platens; manually controlled and automatic switch means for energizing said motor; mechanism for selectively stopping said chains to selectively position said platens; a slidably mounted passaged plunger, communicatively connected to an air valve and a vacuum pump and an air compressor and adapted to seat in said socket-like fitting; a motor driven mechanism for selectively moving said plunger into sealing engagement with said socket-like fittings whereby a partial vacuum will be created in said platens; a clamping frame for supporting plastic film; an upper frame pivotly mounted on said clamping frame; air operated mechanism for selectively lowering and raising said clamping and upper frames to impinge and hold plastic film; slidably mounted mechanism for lowering and elevating said clamping frame; a plurality of upwardly extending posts; a pair of horizontal rails on said posts; a movable oven rollably mounted on said last mentioned rails whereby said oven may be selectively positioned over said frame and said plastic sheet; the downward movement of said clamping frame being adapted to position said plastic film over articles supported on a perforated board on one of said platens; the partial vacuum in said platens being adapted to draw, drape and secure said plastic sheet over the articles and to said board; motor driven mechanism for moving an article-carrying board from said platen and outwardly; a plurality of air-actuated cutters mounted above the edge of said machine; said cutters being lowered to cutting position to slit said article-carrying board in one direction as said board is moved from a platen; an auxiliary cutting table connected to the frame on one side of said machine frame; a pair of bracket-supported rails mounted above said auxiliary table; horizontal rack bars secured on said brackets; a rollable carriage movable on said rails of said auxiliary table; motor operated gear mechanism coacting with said rack bar for moving said carriage horizontally above said auxiliary table; a manifold pipe on said carriage; a plurality of movable spaced apart cutters mounted on said carriage; air-operated mechanism connected to said manifold and adapted to selectively lower said cutters into engagement with said table, said mechanism including springs for elevating said cutters; said cutters on said carriage, when lowered, being adapted to cut transversely the strips of board on said auxiliary table to thereby form individual packages.

8. In a machine for automatically skin-packaging merchandise articles; an elongated frame; transverse shafts journalled adjacent the ends of said frame; a plurality of sprockets mounted on said shafts; an endless conveyor mounted on said sprockets; a plurality of passaged platens pivoted on said conveyor in spaced apart position; means on said frame for guiding said platens; a brake motor for driving said conveyor; a control switch for said motor; mechanism for selectively stopping said conveyor to selectively position said platens; automatic means for intermittently communicating said platens to a vacuum source; a vertically slidable carriage; a clamping frame mounted on said carriage; said clamping frame having a pivotal member; air operated mechanism for opening and closing said clamping frame; said clamping frame being adapted to hold plastic film therein; automatic means for raising and lowering said carriage and said clamping frame; retractable means for heating film in said clamping frame; said film in said clamping frame being selectively positionable upon pervious boards on said platens, said boards being adapted to have articles thereon; mechanism for selectively producing a partial vacuum in said platens to cause draping and securance of heated film over articles on said boards; and an automatic mechanism for moving outwardly said boards having articles secured thereon.

*9. In a machine for automatically skin-packaging merchandise articles, the combination of an elongated frame, a plurality of hollow, perforated passaged platens, conveyor means mounted on said frame and connected to said platens for carrying said platens in a first direction along said frame, selectively operable motor means driving said conveyor means to stop said platens at predetermined positions along said frame, a forming station disposed at a fixed position along said conveyor means, a vertically movable carriage positioned at said forming station, holding means on said carriage for holding a plastic film thereon, means for intermittently feeding a continuous sheet of said film to said holding means in a second direction transverse to said first direction, automatic means for raising and lowering said carriage and said holding means in timed relation with the movement of said conveyor means, an oven, means mounting said oven on said frame for horizontal movement relative to said carriage in a direction parallel to said first direction, a loading station disposed along said conveyor where pervious boards and said articles may be placed on said platens, said plastic film held in said carriage mounted holding means being selectively positionable on said pervious boards on said platens during the lowering of said carriage, means for selectively producing a vacuum in the platen located at said feeding station to cause draping and securing of said heated plastic film on said boards over the articles thereon, said feed means automatically moving said boards having articles secured thereon by said plastic film out of said machine in said second direction while simultaneously feeding a succeeding portion of said film adjacent said carriage.*

*10. In a machine for automatically skin-packaging merchandise articles, the combination of a frame, platen means mounted on said frame and having a plurality of apertures therein, a skin-packaging station, conveyor means for moving said platen means to said packaging station, feeding apparatus for feeding a sheet material to said packaging station adjacent to said platen means, means for connecting said platen to a vacuum source to draw a portion of said sheet material over an article to be packaged at said packaging station toward said platen to form said sheet into a plurality of individual package areas, said feeding apparatus then extracting the thusly formed sheet from said station, slitting said sheet to separate said areas from one another to form separated sections, and feeding the separated sections to a succeeding station, said feeding apparatus comprising means for supporting a continuous supply of said sheet material on a side of said packaging station opposite to said succeeding station, a cylindrical roller rotatably mounted between said packaging station and said succeeding station and on which said sheet is adapted to lie, a plurality of knife-edged cutting wheels journalled for free rotation on an axis parallel to the axis of rotation of said roller, means for urging said wheels against said roller, and selectively operable drive means for rotating said roller to pull a portion of said sheet material into said packaging station from said supply for forming of said portion into package areas in a later operation and for simultaneously slitting the previously formed por-*

*tion of said sheet into said separate sections and feeding the separated sections to said succeeding station.*

*11. The machine set forth in claim 10, wherein said wheel urging means comprises a plurality of fluid operated power cylinders connected to a common source of pressurized fluid, said knife-edged wheels being respectively mounted on said cylinders.*

*12. The machine set forth in claim 11 wherein said sheet material is a thin plastic film and means are provided at said first station for securing a substantially heavier and more rigid backing member thereto, both the backing member and the attached film being disposed between said wheel and said roller for feeding both the backing member and the attached film to said succeeding station and for slitting both said backing member and said film.*

References Cited in the file of this patent or the original patent

UNITED STATES PATENTS

| | | |
|---|---|---|
| 1,998,357 | Carlson | Apr. 16, 1935 |
| 2,116,995 | Bickford | May 10, 1938 |
| 2,623,587 | Hervey | Dec. 30, 1952 |
| 2,676,440 | Campbell | Apr. 27, 1954 |
| 2,712,208 | Campbell | July 5, 1955 |
| 2,750,719 | Wandelt | June 19, 1956 |
| 2,804,143 | Stephens et al. | Aug. 27, 1957 |
| 2,888,787 | Cloud | June 2, 1959 |
| 2,892,294 | La Branche | June 30, 1959 |
| 2,912,805 | Maynard | Nov. 17, 1959 |
| 2,927,409 | Heyer | Mar. 8, 1960 |